April 28, 1959 — P. R. DIERDORF — 2,884,004
ACETYLENE RELIEF VALVE
Filed Feb. 23, 1954
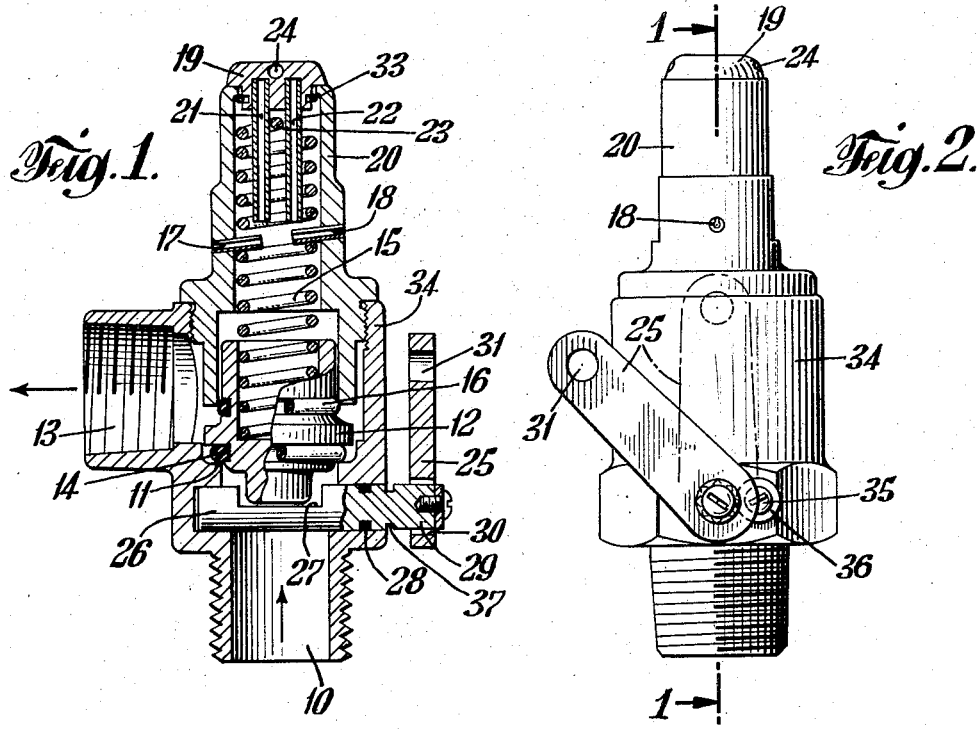
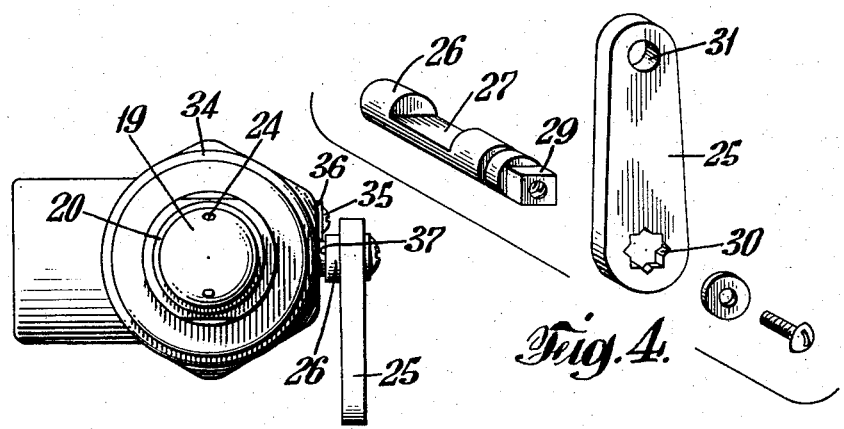
INVENTOR
PAUL R. DIERDORF
BY
ATTORNEY

United States Patent Office 2,884,004
Patented Apr. 28, 1959

2,884,004

ACETYLENE RELIEF VALVE

Paul R. Dierdorf, Indianapolis, Ind., assignor to Union Carbide Corporation, a corporation of New York Application February 23, 1954, Serial No. 411,700

7 Claims. (Cl. 137—522)

This invention relates to a relief valve for acetylene gas apparatus such as generators, hydraulic back pressure valves, and cylinder manifolds, and has for an object to simplify the construction of such a valve and reduce the number of parts heretofore thought necessary. Another object is to prolong the life of such a valve and render its adjustment easy without resort to special tools.

Referring to the drawings:

Fig. 1 shows a vertical section through one embodiment of a relief valve incorporating this invention, the section being taken on the line 1—1 of Fig. 2; Fig. 2 is a right side view of the device of Fig. 1; Fig. 3 is a top or plan view of the device of Fig. 1; and Fig. 4 is an exploded view showing a manually actuated cam for opening the valve.

This relief valve is designed particularly for use with acetylene apparatus and is provided with a high pressure passageway 10, a stationary valve member 11, a movable valve member 12, and an outlet passage 13 through which gas may escape when the valve is open. The movable valve member 12 carries a rubber O ring 14 to function as a seat for sealing the movable valve member against the stationary valve member in closed position. A flange above the rubber O ring on the movable valve member enters the recess above the sealing edge of the stationary member to provide the proper lift for quick opening of the valve for relief under excessive pressure. The corner of the stationary valve member 11, on which the O ring rests must be smooth and relatively sharp. The bore of this member directly below the O ring must be of such diameter as to contact the O ring at its lowest point for proper sealing. The larger diameter hole in the body 34 above the stationary valve member must be of sufficient diameter and depth to permit a small peripheral opening to exist between the shoulder formed by this diameter and the bottom edge of the flange above the O ring of the movable member 12 with the valve set for the desired relief pressure. This is essential for quick opening of the valve for a blow-down effect. The diameter of the flange of the movable member in combination with the diameter of the hole in the body concentric with the flange along with the depth to which this flange enters this hole will determine the pop and blown characteristics of the valve.

The movable valve member is retained in its closed position by a spring 15. Another rubber O ring packing member 16 is carried by the movable valve member 12 for the purpose of preventing gas and foreign particles from passing into the space around the helical spring 15.

Gas from an acetylene generator for example is likely to contain moisture which may tend to condense and freeze and thus prevent the movable member from functioning. Lime dust also present in the gas is prevented from entering this space around the spring where its presence would impair the operation of the valve.

An abutment for the spring 15 intermediate its ends is provided by rollpins 17 and 18 projecting inwardly from the housing 20 around the spring 15. A cap 19 rests on top of the housing 20 for closing it but does not have to be threaded or otherwise secured to the housing against being raised under spring pressure. This is made possible because the portion of the spring 15 between the cap 19 and the rollpin abutments 17 and 18 does not have to be under any stress. The bores of the rollpins 17 and 18 constitute vent passages by means of which any slight superatmospheric pressure within the housing 20 may be vented to the atmosphere. Projecting inwardly from the cap 19 are rollpins 21 and 22 secured to the cap, and an upper end portion 23 of the spring 15 projects between the pins 21 and 22. A recess 24 is provided in the cap 19, whereby some rod-like instrument such as a nail may be inserted in the cap and the cap rotated in whatever direction is desired to turn the spring 15 and control the number of convolutions beneath the rollpins, and thus adjust the setting of the relief valve to the desired pressure for which the valve is intended to open.

On acetylene generators it is customary to raise the relief valve slowly for venting the generator at the end of a run. For this purpose a lever 25 is secured on cam shaft 26 provided intermediately with a flat surfaced cam 27 positioned to engage the bottom of the valve member 12 and capable of slowly raising the movable valve member 12. Another rubber packing ring 28 is mounted on the cam shaft 26 where it passes through the body 34. The outer end of this shaft 26 is of polygonal cross section 29 for reception within a recess 30 of the lever 25 having inwardly projecting teeth. Preferably a larger number of teeth than is shown in the drawing are provided in order that the lever 25 may be more nearly mounted in the desired position for actuation of the shaft 26. A threaded connection is usually attached to the actuating rod and pivoted in the recess 31 of the lever arm 25 between an actuating rod not shown and the lever arm. By means of the threaded connection and by means of the number of inwardly projecting teeth in the recess 30, a precise angular position for the lever arm is made possible for slow opening of the valve when necessary.

Among the advantages of this invention may be mentioned the ease of adjustment for the spring 15 and the simplicity of the cap 19. To hold the cap 19 in its position on the housing 20 a small snap ring 33 shown in Fig. 1 has been found useful. By means of the rollpins 21 and 22 it is possible to adjust the stress on the spring beneath the rollpins 17 and 18 and thus control the pressure setting of the movable valve member 12. The packing 16 seals the portion of the housing around the spring 15 against leakage of gas passing upward instead of outward through the passage 13. The O ring 16 also functions to prevent dirt and moisture from entering the housing. This O ring extends slightly below the housing as shown in Fig. 1, to provide a resilient contact between the movable member and housing, thus preventing freezing of these members under such conditions. When the valve opens the larger area exposed to pressure (due to the flange above O ring 14) assists in quick opening and in holding the valve in this position to produce more of a pop and blow-down action until the pressure rapidly falls below the pressure required for opening the valve. The rapid blow-down quickly releases the pressure acting on this larger area thus allowing the valve to snap closed with such force as to effect a leak tight seal upon closing. These O rings being of rubber are easily replaceable. The rollpins 17 and 18 function as an abutment and also as a venting means from inside the housing 20 to the atmosphere.

An advantage in the spring adjustment disclosed is that the position of the rollpins 17 and 18, the size of the spring wire, and number of spring convolutions may be correlated with the spring constant so that the convolutions under the rollpins may be insufficient in number for them to become contiguous one another for an upper limit of adjustment and this limit incapable of being raised above a safe value for the relief pressure of acetylene. The roll pins 21 and 22 become disengaged from the upper end portion of the spring 23 before this upper limit of adjustment has been exceeded. By retracting the spring into the housing 20 so that the spring is slightly compressed above roll pins 17 and 18, the valve can be adjusted for any desired pressure relief from zero to the maximum allowable safe value. The need for a screw threaded adjusting cap for spring 15 has been eliminated. Locating the lifting mechanism 27 below the movable valve member 12 avoids the necessity for any lift pin extending upward as has been common with these relief valves heretofore. The body 34 is now forged to effect a saving as compared with a porous cast body. The stationary valve member 11 is machined in the body 34 and no separate part is now required. The O ring 14 is easily removed and a new one replaced without special tools. The flange above this O ring engages the lower end of the housing 20 as a stop in event of sudden opening of the valve. The spring 15 is removed with the housing 20 for cleaning or for replacement of the O ring 14 as the movable valve member can be removed after unscrewing the housing 20 and removing the spring 15 with the housing 20. The roll pins are preferably of stainless steel. The valve when set to leak at 15 pounds per square inch will pop open at about 16.5 pounds and reseal leak tight at 13.5 pounds per square inch. The O ring 16 should not roll or stick and to prevent it doing so this ring extends slightly below the housing 20 in closed position. The valve of this invention can be adjusted without disconnecting the manual operating mechanism as has heretofore been necessary. The roll pins 21 and 22 preferably become disengaged from the spring 15 before the maximum allowable pressure setting is exceeded. Thus the length of the rollpins 21 and 22 is a factor in preventing the spring 15 from being stressed more than some predetermined upper limit. Simlicity and convenience in assembly is an advantage with rollpins 17, 18, 21 and 22. The stainless steel from which these pins are made usually possesses some resiliency with the result that they fit more snugly in drilled holes than do solid fins in commercial sizes. The screw 35 holds the washer 36 in place extending into the groove 37 in the cam shaft 26 to prevent this shaft 26 being accidentally withdrawn from the body 34 of the relief valve.

I claim:

1. An acetylene relief valve comprising a body having inlet and outlet passageways and a valve seat member therebetween, a valve member having a head movable toward and away from said seat member, a rubber O-ring on one of said valve members engaging the other in seating position, a casing attached to said body having a bore and said movable valve head member having a portion slidable on said bore, a coil spring in said bore engaging said movable portion for urging said head against said seat, and a second rubber O-ring in said slidable portion of said valve head member for preventing access of acetylene to said spring when the movable element has moved away from said seat member, said second O-ring being located partly outside of said bore when said movable valve element is in seating position.

2. A relief valve according to claim 1 for venting acetylene gas under superatmospheric pressure in which a cap is rotatably mounted on said casing above said coil spring, said cap being provided with means to assist in turning said cap, means for interconnecting the cap and spring for rotation together, an abutment on said casing intersecting a coil of the spring intermediate the ends of said spring, whereby stress in said spring between the abutment and movable valve element may be adjusted by rotation of said cap and interconnected spring without having spring pressure transmitted to said cap.

3. In an acetylene relief valve comprising a body having inlet and outlet passageways and a valve seat member therebetween, a valve member having a head movable toward and away from said seat member, a casing attached to said body having a bore and said valve head member having a portion slidable on said bore, a coil spring in said bore engaging said movable portion for urging said head against said seat, and a cap provided on said casing above said coil spring, the combination therewith of the improvement means for adjusting the stress on said spring and the pressure setting of said movable valve element by angular displacement of said cap without having spring pressure transmitted to said cap, said improvement means comprising at least one pin projecting through a side wall of said casing and constituting an abutment for said spring intermediate its ends, an unstressed portion of said spring being between said pin abutment and said cap, and a pair of spaced pins carried by said cap and projecting inwardly, an end portion of the unstressed part of said spring near said cap being bent to extend between said spaced pins whereby on rotation of said cap and pins the stress in said spring between the movable valve element and said pin abutment is adjusted.

4. A relief valve according to claim 3 in which said pin abutment is a hollow rollpin, the inside passage of which constitutes a vent for any gas under higher than atmospheric pressure within said casing.

5. A relief valve according to claim 4 wherein said hollow rollpin is constructed of stainless steel.

6. An acetylene relief valve comprising a body having inlet and outlet passageways and a valve seat member therebetween, a valve member having a head movable toward and away from said seat member, a rubber O-ring on said movable valve member engaging the valve seat member in seating position, a casing threadably attached to said body having a bore and said movable valve head member having a portion slidable on said bore, a coil spring in said bore engaging said movable portion for urging said head against said seat, and a second rubber O-ring in said slidable portion of said valve head member for preventing access of acetylene to said spring when the movable valve member has moved away from said seat member, said second O-ring being located partly outside of said bore when said movable valve element is in seating position, a cap rotatably mounted on said casing above said coil spring, said cap being formed to receive a tool to assist in turning said cap, means including a pair of spaced pins projecting inwardly from said cap, an end of said spring extending between said pins, a hollow rollpin abutment on said casing intersecting a coil of the spring intermediate the ends of said spring, whereby stress in said spring between the pin abutment and movable valve member may be adjusted by rotation of said cap and interconnected spring without having spring pressure transmitted to said cap.

7. An acetylene relief valve according to claim 6 in which a cam shaft positioned on the high pressure side of said seat member is in contact with said movable valve member, said cam shaft extends through the wall of said valve body and has attached thereto a handle for rotating said cam shaft and thus manually moving said movable valve member in relation to said seat member, said cam shaft containing a rubber O-ring in contact with said valve body wall to prevent external gas leakage along said shaft.

References Cited in the file of this patent

UNITED STATES PATENTS

| | | |
|---|---|---|
| 924,341 | Gerisch | June 8, 1909 |
| 1,993,195 | Temple | Mar. 5, 1935 |
| 2,320,444 | Martin | June 1, 1943 |
| 2,536,691 | Miller | Jan. 2, 1951 |
| 2,602,631 | Eickmeyer | July 8, 1952 |
| 2,660,834 | MacGlashan | Dec. 1, 1953 |
| 2,755,817 | Barr | July 24, 1956 |